United States Patent

Buchecker et al.

[11] Patent Number: 5,486,310
[45] Date of Patent: Jan. 23, 1996

[54] LIQUID CRYSTALLINE MIXTURES HAVING A CHIRAL TILTED SMECTIC PHASE

[75] Inventors: Richard Buchecker, Zurich, Switzerland; Nina I. Chernova, Moscow, U.S.S.R.; Alexander V. Ivaschenko, Moscow, U.S.S.R.; Marina V. Loseva, Moscow, U.S.S.R.; Olga S. Petrashevich, Moscow, U.S.S.R.; Evgeniy P. Pozhidaev, Moscow, U.S.S.R.; Arnold Z. Rabinovich, Moscow, U.S.S.R.; Martin Schadt, Seltisberg, Switzerland

[73] Assignees: Hoffmann-La Roche Inc., Nutley, N.J.; Niopic Moscow Research and Production Association, Moscow, U.S.S.R.

[21] Appl. No.: 198,669

[22] Filed: Feb. 18, 1994

Related U.S. Application Data

[60] Continuation of Ser. No. 68,489, May 27, 1993, abandoned, which is a division of Ser. No. 883,245, May 7, 1992, Pat. No. 5,242,619, which is a continuation of Ser. No. 343,477, Apr. 26, 1989, abandoned.

[30] Foreign Application Priority Data

Apr. 27, 1988 [CH] Switzerland ........................... 1570/88

[51] Int. Cl.$^6$ .................... C09K 19/34; C09K 19/12; C07C 69/76; C02F 1/13
[52] U.S. Cl. ............... 252/299.61; 252/299.66; 359/103; 560/102; 544/298; 546/339
[58] Field of Search ................ 252/299.66, 299.61; 544/298; 546/339; 359/103

[56] References Cited

U.S. PATENT DOCUMENTS

| | | | |
|---|---|---|---|
| 4,732,699 | 3/1988 | Higuchi et al. | 252/299.66 |
| 4,753,752 | 6/1988 | Raynes et al. | 252/299.65 |
| 4,834,904 | 5/1989 | Krause et al. | 252/299.01 |
| 5,064,569 | 11/1991 | Geelhaar et al. | 252/299.65 |
| 5,089,169 | 2/1992 | Mochizuki et al. | 252/299.65 |
| 5,100,579 | 3/1992 | Higuchi et al. | 252/299.65 |
| 5,128,062 | 7/1992 | Kobayashi et al. | 252/299.66 |
| 5,290,477 | 3/1994 | Kondo et al. | 252/299.61 |

FOREIGN PATENT DOCUMENTS

| | | |
|---|---|---|
| 213841 | 3/1987 | European Pat. Off. . |
| 309774 | 11/1989 | European Pat. Off. . |
| 339414 | 11/1989 | European Pat. Off. . |
| 1152430 | 6/1989 | Japan . |
| 87/05017 | 8/1987 | WIPO . |
| 87/05018 | 8/1987 | WIPO . |

OTHER PUBLICATIONS

Demus et al., Z. Phys. Chemie, Leipzig 252, (1973) pp. 93–112.
Demus et al., Chem. Abs. 70:152429v (1973).
Rabinovich et al., Liq. Crys. 6(5) 533 (1989).
Mol. Liq. Cryst. 1992, vol. 215, pp. 13–30.

*Primary Examiner*—Cynthia Harris
*Attorney, Agent, or Firm*—George M. Gould; George W. Johnston; Ellen Ciambrone Coletti

[57] ABSTRACT

Optically active compounds of the formula

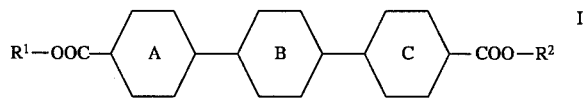

wherein rings A, B and C each independently are unsubstituted or each are 1,4-phenylene substituted with at least one of halogen-, cyano-, methyl- or methoxy in which optionally 1 CH group or 2 CH groups is/are replaced by nitrogen; $R^1$ is a radical of an optically active terpene alcohol after cleavage of the hydroxy group or a group —$(CH_2)_m$—$C^*HX^1$—$R^3$; $R^2$ is a radical of an optically active terpene alcohol after cleavage of the hydroxy group or a group —$(CH_2)_n$—$C^*HX^2$—$R^4$; m and n each independently stand for the number 0 or 1; $C^*$ denotes a chiral carbon atom; $X^1$ and $X^2$ each independently are fluorine, chlorine, cyano, methyl or methoxy; $R^3$ and $R^4$ each independently denote a group R, phenyl or phenyl substituted with R, with the proviso that $R^3$ is different from $X^1$ and $R^4$ is different from $X^2$; R is an alkyl group in which optionally one methylene group is replaced by oxygen and/or optionally one group CH—CH is replaced by a group C≡C; with the proviso that $R^1$ and $R^2$ are not simultaneously 2-alkyl when rings A, B and C together are p-terphenyl,
as well as liquid crystalline mixtures and their use for electro-optical purposes.

12 Claims, No Drawings

LIQUID CRYSTALLINE MIXTURES HAVING A CHIRAL TILTED SMECTIC PHASE

This is a continuation of application Ser. No. 08/068,489, filed May 27, 1993, now abandoned, which is a divisional of Ser. No. 07/883,245, filed May 7, 1992, U.S. Pat. No. 5,242,619 which is a continuation of Ser. No. 07/343,477, filed Apr. 26, 1989, now abandoned.

FIELD OF THE INVENTION

The present invention is concerned with novel liquid crystalline mixtures, especially mixtures having a chiral tilted smectic phase, as well as novel optically active diesters and their use for electro-optical purposes.

BACKGROUND OF THE INVENTION

Liquid crystals are suitable as dielectrics in indicating devices, since their optical properties can be influenced by an electrical potential. Suitable electro-optical devices are well-known to the person skilled in the art. Examples of such devices are cells having dynamic scattering, DAP cells (deformation of aligned phases), TN cells (twisted-nematic) and STN cells (super twisted-nematic) having a twisted nematic structure, guest/host cells, phase change cells having a cholesteric-nematic phase transition and SBE cells (super birefringence effect).

Further, electro-optical devices based on chiral tilted smectic liquid crystals are proposed in Appl. Phys. Lett. 36, 899 (1980) and in Recent Developments in Condensed Matter Physics 4, 309 (1981). In such devices the ferroelectric properties of these materials are used. Suitable tilted smectic phases are, for example, smectic C, F, G, H, I and K phases. There are generally preferred smectic C phases which, in particular, permit high response speeds. The chiral tilted phases are usually denoted by $S^*_C$, $S^*_F$ etc., with the asterisk indicating the chirality.

Ferroelectric liquid crystals should have good stability under chemical and thermal influences and in electrical fields. Further, they should have a suitable mesophase over a broad temperature range, low viscosity and especially a sufficiently high spontaneous polarization.

Suitable mixtures used as ferroelectric liquid crystals are one or more optically active doping substances and a liquid crystal material which may include one or more components and which as a rule should have a tilted smectic phase. The optically active doping substances need not themselves be smectic, but in the liquid crystal material they should produce a chiral tilted smectic phase and should induce a high spontaneous polarization. In order to achieve a high spontaneous polarization in the mixture and/or in order that the amount of optically active doping substances can be held relatively low, doping substances which already in small amounts are capable of inducing a high spontaneous polarization are desired.

SUMMARY OF THE INVENTION

The invention is concerned with optically active compounds of the formula

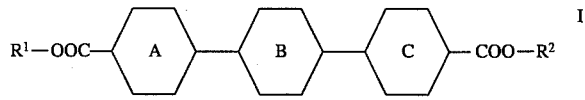

wherein rings A, B and C each independently are 1,4-phenylene, which is unsubstituted or substituted with at least one of halogen, cyano, methyl or methoxy, and in which optionally 1 CH group or 2 CH groups is/are replaced by nitrogen: $R^1$ is a radical of an optically active terpene alcohol after cleavage of the hydroxy group or a group $-(CH_2)_m-C^*HX^1-R^3$; $R^2$ is a radical of an optically active terpene alcohol after cleavage of the hydroxy group or a group $-(CH_2)_n-C^*HX^2-R^4$; m and n each independently stand for the number 0 or 1; $C^*$ denotes a chiral carbon atom; $X^1$ and $X^2$ each independently are fluorine, chlorine, cyano, methyl or methoxy; $R^3$ and $R^4$ each independently are a group R, phenyl or phenyl substituted with R, provided that $R^3$ is different from $X^1$ and $R^4$ is different from $X^2$; R is an alkyl group in which optionally one methylene group is replaced by oxygen or optionally one group CH—CH is replaced by a group C=C; provided that $R^1$ and $R^2$ are not simultaneously 2-alkyl when rings A, B and C together are p-terphenyl.

The compounds in accordance with the invention induce a surprisingly high spontaneous polarization in tilted smectic phases. They are stable and colourless and have a remarkably good solubility in usual liquid crystal materials. Some of them have liquid crystalline properties: but the non-liquid crystalline compounds of formula I as a rule also give no clearing point depressions or only small clearing point depressions in mixtures.

DETAILED DESCRIPTION OF THE PREFERRED EMBODIMENTS

The invention is concerned with optically active compounds of the formula

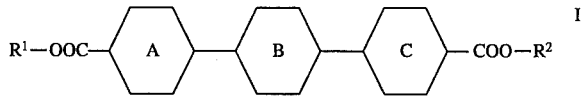

wherein rings A, B and C each independently are 1,4-phenylene, which is unsubstituted or substituted with at least one of halogen, cyano, methyl or methoxy, and in which optionally 1 CH group or 2 CH groups is/are replaced by nitrogen: $R^1$ represents the radical of an optically active terpene alcohol after cleavage of the hydroxy group or a group $-(CH_2)_m-C^*HX^1-R^3$; $R^2$ represents the radical of an optically active terpene alcohol after cleavage of the hydroxy group or a group $-(CH_2)_n-C^*HX^2-R^4$; m and n each independently stand for the number 0 or 1; $C^*$ denotes a chiral carbon atom; $X^1$ and $X^2$ each independently represent fluorine, chlorine, cyano, methyl or methoxy; $R^3$ and $R^4$ each independently denote a group R, phenyl or phenyl substituted with R, provided that $R^3$ is different from $X^1$ and $R^4$ is different from $X^2$; R is an alkyl group in which optionally one methylene group is replaced by oxygen or optionally one group CH—CH is replaced by a group C=C; provided that $R^1$ and $R^2$ do not simultaneously denote 2-alkyl when rings A, B and C together represent p-terphenyl.

The term "1,4-phenylene, which is unsubstituted or substituted with at least one of halogen, cyano, methyl or methoxy, and in which optionally 1 CH group or 2 CH groups is/are replaced by nitrogen" embraces in the scope of the present invention groups such as 1,4-phenylene, fluoro-1,4-phenylene, chloro-1,4-phenylene, cyano-1,4-phenylene, 2,3-dicyano-1,4-phenylene, methyl-1,4-phenylene, methoxy-1,4-phenylene, pyridine-2,5-diyl, pyrimidine-2,5-diyl, pyrazine-2,5-diyl, pyridazine-3,6-diyl and the like.

The term "halogen" embraces fluorine, chlorine, bromine and iodine, preferably fluorine and chlorine.

The term "radical of an optically active terpene alcohol after cleavage of the hydroxy group" denotes the group T of an optically active terpene alcohol of the formula TOH. The term "terpene alcohol" will be familiar to the person skilled in the art, for example, from Römpps Chemie-Lexikon, Volume 6 (1977), and denotes the alcohols derived from monoterpenes. The term "monoterpene" embraces terpene hydrocarbons $C_{10}H_{16}$ and their hydrogenation and dehydrogenation derivatives. Examples of preferred optically active terpene alcohols are (1R,2S,5R)-(−)-menthol, (1S,2R,5R)-(+)-isomenthol, (1S,2S,3S,5R)-(+)-isopinocampheol, (1S)-(−)-borneol, (1R)-(−)-myrtenol, (1S,2S,5R)-(+)-neomenthol, (−)-carveol, (+)-dihydrocarveol, (+)-terpinen-4-ol, (+)-α-terpineol and the like.

The term "alkyl group in which optionally one methylene group is replaced by oxygen or optionally one group CH—CH is replaced by a group C≡C" embraces alkyl. alkoxy, alkoxyalkyl, alkenyl, alkenyloxy, alkenyl-oxyalkyl and alkoxyalkenyl such as methyl, ethyl, propyl, isopropyl, butyl, isobutyl, pentyl, hexyl, heptyl, octyl, nonyl, methoxy, ethoxy, propyloxy, butyloxy, pentyloxy, hexyloxy, methoxymethyl, ethoxymethyl, 2-methoxyethyl, vinyl, 1-propenyl, 1-butenyl, 1-pentenyl, allyl, 2-butenyl, 2-pentenyl, 3-butenyl, 3-pentenyl, 4-pentenyl, 5-hexenyl, 6-heptenyl, allyloxy, 3-butenyloxy, 4-pentenyloxy, allyloxymethyl, 3-methoxy-1-propenyl and the like. Preferred groups R are alkyl, alkoxy, alkenyl and alkenyloxy. Further, straight-chain alkyl and isoalkyl as well as the groups derived therefrom having an oxygen atom and/or a C═C double bond are referred. Preferably, the groups R have 1–15, especially 1–9, carbon atoms.

The term "phenyl substituted with R" accordingly denotes a phenyl residue which is substituted with one or more of the aforementioned groups R, preferably a phenyl residue which is substituted in the p-position with R and/or in the o- or m-position with methyl or methoxy, such as o-tolyl, m-tolyl, p-tolyl, 2-methoxyphenyl, 4-methoxyphenyl, 2-methyl-4-methoxyphenyl, 4-ethylphenyl, 4-ethoxyphenyl, 4-allyloxyphenyl and the like. The phenyl residues substituted with R preferably have a total of 7–15, especially 7–9, carbon atoms.

The groups R in $R^3$ and $R^4$ can have the same or different significances.

Formula I above embraces especially the optically active compounds of the formula

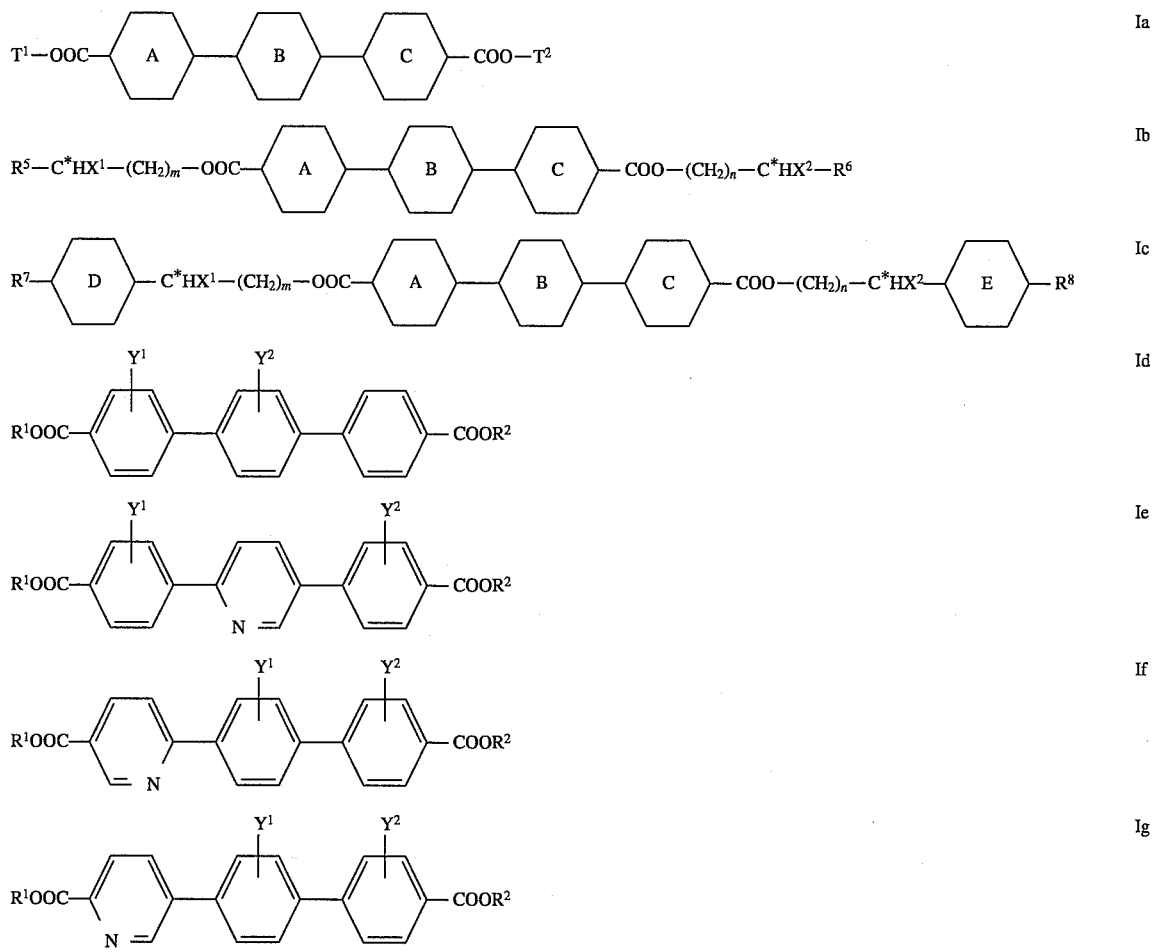

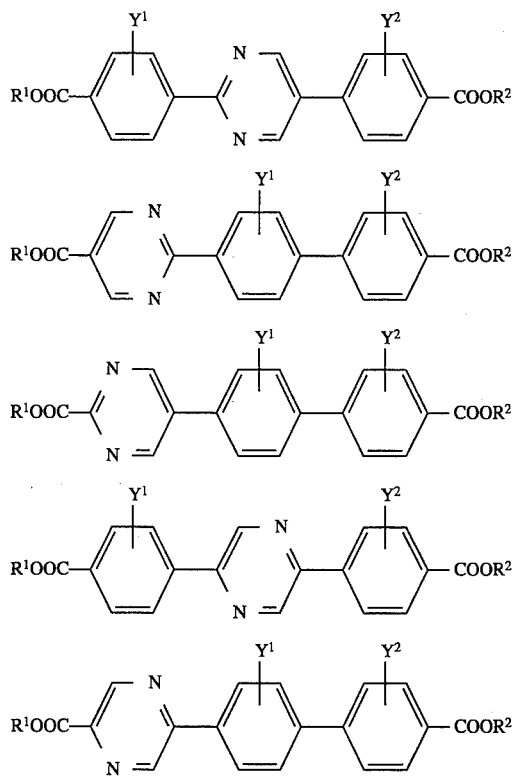

wherein $R^1$, $R^2$, $X^1$, $X^2$, m, n, C* and rings A, B and C have the above significances: $T^1$ and $T^2$ each independently denote the radical of an optically active terpene alcohol after cleavage of the hydroxy group; $R^5$ and $R^6$ each independently are an alkyl group in which optionally one methylene group is replaced by oxygen and/or one group CH—CH is replaced by a group C≡C, with the proviso that $R^5$ is different from $X^1$ and $R^6$ is different from $X^2$ and with the further proviso that formula Ib does not are 4,4"-bis(2-alkyloxycarbonyl)-p-terphenyl; rings D and E each independently denote 1,4-phenylene, methyl-1,4-phenylene or methoxy-1,4-phenylene; $R^7$ and $R^8$ each independently are hydrogen or an alkyl group in which optionally one methylene group is replaced by oxygen and/or one group CH—CH is replaced by a group C≡C; $Y^1$ and $Y^2$ each independently denote hydrogen, halogen, cyano, methyl or methoxy, with the proviso that in formula Id $Y^1$ and/or $Y^2$ is different from hydrogen when $R^1$ and $R^2$ both are 2-alkyl.

In formula I, Ia, Ib and Ic above, preferably rings A, B, and C stand for 1,4-phenylene or one or two of the rings also stand(s) for fluoro-1,4-phenylene, chloro-1,4-phenylene, cyano-1,4-phenylene, 2,3-dicyano-1,4-phenylene, methyl-1,4-phenylene, methoxy-1,4-phenylene, pyridine-2,5-diyl, pyrimidine-2,5-diyl and/or pyrazine-2,5-diyl. In general, those compounds in which rings A, B and C stand for unsubstituted or halogen-, cyano-, methyl- and/or methoxy-substituted 1,4-phenylene or one of rings A, B and C also stands for pyrimidine-2,5-diyl are especially preferred. Preferably, the phenylene groups are unsubstituted or a maximum of one of these groups substituted.

Of the compounds of formula Id–Il there are generally preferred those in which one of the substituents $Y^1$ and $Y^2$ is hydrogen or both substituents $Y^1$ and $Y^2$ are hydrogen. Compounds of formula Id, Ih, Ii and Ij are generally preferred.

Preferred compounds of formula I and Ib–Il above are those in which m stands for the number 0 and $X^1$ stands for cyano, methyl or methoxy or m stands for the number 1 and $X^1$ stands for fluorine, chlorine, cyano, methyl or methoxy. Further, in formula I and Ib–Il above n preferably stands for the number 0 and $X^2$ stands for cyano, methyl or methoxy or n preferably stands for the number 1 and $X^2$ stands for fluorine, chlorine, cyano, methyl or methoxy.

Chlorine, cyano and methyl are preferred significances of $X^1$ and $X^2$.

$R^5$ and $R^6$ preferably have 1–15, especially 2–9, carbon atoms. Alkyl and alkenyl are preferred residues $R^5$ and $R^6$. When $X^1$ represents methyl, $R^5$ can preferably also are alkoxy or alkenyloxy and, when $X^2$ represents methyl, $R^6$ can preferably also are alkoxy or alkenyloxy. Especially preferred residues $R^5$ and $R^6$ are n-alkyl and isoalkyl.

$R^7$ and $R^8$ and preferably have 1–9, especially 1–3, carbon atoms. Alkyl alkoxy and alkenyloxy, especially methyl, methoxy and allyloxy, are preferred residues $R^7$ and $R^8$.

Rings D and E preferably denote 1,4-phenylene.

Accordingly, $R^3$ and, respectively, $R^4$ in the above formula can preferably are alkyl, alkenyl, phenyl, p-alkylphenyl, p-alkoxyphenyl or p-alkenyloxyphenyl with in each case a maximum of 15 carbon atoms, especially a maximum of 9 carbon atoms. Examples of especially preferred residues $R^3$ and, respectively, $R^4$ are n-alkyl, isoalkyl, phenyl, p-methylphenyl, p-methoxyphenyl and the like.

Preferred residues $R^1$ and $R^2$ will also be evident from the above details. Especially preferred residues $R^1$ and $R^2$ are the groups —C*H(CH$_3$)—$R^3$ and —CH$_2$—C*HX$^1$—$R^3$ and, respectively, C*H(CH$_3$)—$R^4$ and —CH$_2$—CHX$^2$—$R^4$ in which $R^3$ and $R^4$ have the preferred significances referred to above and $X^1$ and $X^2$ are fluorine, chlorine, cyano, methyl or methoxy, preferably chlorine or cyano. Further, $R^1$ and/or $R^2$ can preferably also are the radical ($T^1$ or $T^2$) of an optically active terpene alcohol such as menthol, isomenthol, isopinocampheol, borneol, myrtenol, neomenthol, carveol, dihydrocarveol, terpinen-4-ol or α-terpineol after cleavage of the hydroxy group. Examples of especially preferred residues $R^1$ and $R^2$ are menthyl, 2-alkyl, 2-methylalkyl, 2-chloroalkyl, 2-cyanoalkyl, 1-phenylethyl and the like.

The configuration at the centre of chirality in the compounds of formula I is preferably such that the two chiral groups induce in the liquid crystal mixture a spontaneous polarization in the same direction. The influence on the helical twisting can be in the same direction or opposite.

The residues $R^1$ and $R^2$ in formula I and Id–II above can be different or, preferably, the same. When the residues $R^1$ and $R^2$ have the same groups and bonds, that is, have the same significance apart from the configuration, then they should preferably not be a mirror image to one another, but should preferably have the same configuration. This is especially true when the ring system consisting of rings A, B and C has a plane of symmetry perpendicular to the longitudinal axis of the molecule.

Analogously, the wing groups in formula Ib and Ic can preferably have the same significance, that is, m can have the significance of n, $X^1$ can have the significance of $X^2$, $R^5$ can have the significance of $R^6$, ring D can have the significance of ring E and $R^7$ can have the significance of $R^8$ and the configuration at the chiral carbon atoms is in this case preferably the same.

The preparation of the compounds of formula I and of the starting materials can be effected according to methods described in standard works (for example, Houben-Weyl, Methoden der Organischen Chemie, Georg Thieme Verlag, Stuttgart). Preferably, the preparation is effected by esterifying the dicarboxylic acids of the formula

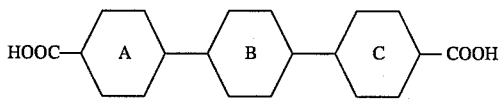

II wherein rings A, B and C have the above significances, or suitable derivatives (for example, acid chlorides) of these dicarboxylic acids with the alcohol $R^1OH$ (when $R^1$ and $R^2$ have the same significance) or with the alcohols $R^1OH$ and $R^2OH$. When $R^1$ and $R^2$ have different significances, the esterification can be effected stepwise. If desired, the esterification can also be effected in one step and the mixture of compounds of formula I obtained can be used as such or can be separated according to usual methods (for example, chromatographic separation, recrystallization).

The dicarboxylic acids of formula II are known compounds or can be prepared in an analogous manner to known compounds. For example, they can be obtained by hydrolysis from corresponding compounds which have suitable functions, for example, cyano, amide and/or ester groups, in place of the carboxy groups. Suitable compounds are known, for example, from D. Demus et al., Flüssige Kristalle in Tabellen, VEB Deutscher Verlag für Grundstoffindustrie, Leipzig and the literature references mentioned therein. Further, they can be obtained in an analogous manner to the known methods for the preparation of liquid crystals [for example, DE-A-2641724, Z. Naturforschung 33b, 433 (1978), Z. Chemie 17,. 63 (1977), Mol. Cryst. Liq. Cryst. 42, 1225 (1977)] by using, in place of the alkyl or alkoxy wing groups usually used, for example, corresponding compounds with cyano, amide or methylcarbonyl wing groups.

Furthermore, the dicarboxylic acids of formula II can also be obtained from the compounds of the formula

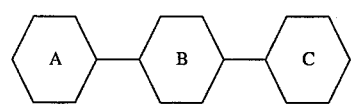

III wherein rings A, B and C have the above significances, for example, by Friedel-Crafts reaction with acetyl chloride in the presence of aluminium trichloride and subsequent haloform degradation with sodium hypobromite or by Friedel-Crafts reaction with oxalyl chloride in the presence of aluminium trichloride and, if desired, hydrolysis of the dicarboxylic acid chloride obtained.

The compounds of formula I can be used as chiral doping substances in liquid crystalline mixtures. The invention is therefore also concerned with a liquid crystalline mixture having at least two components, wherein at least one component is an optically active compound of formula I. Conveniently, the mixture contains a liquid crystal material having a nematic, cholesteric or smectic phase and one or more optically active compounds of formula I.

Mixtures having a chiral tilted smectic phase, especially those having a $S^*_C$ phase, are preferred. These mixtures preferably contain a liquid crystal material having a tilted smectic phase (especially a smectic C phase) and one or more optically active compounds of formula I.

The amount of compounds of formula I in the mixtures in accordance with the invention can vary in wide limits and can be, for example, about 0.5–40 wt. %. In general, a range of about 1–20 wt. % is preferred and a range of about 3–10 wt. % is especially preferred.

As further components there come into consideration usual liquid crystal materials. The mixtures in accordance with the invention preferably contain, in addition to one or more compounds of formula I, one or more of the compounds of the following formula

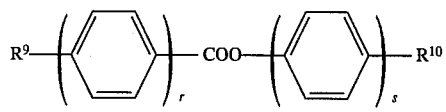

IV

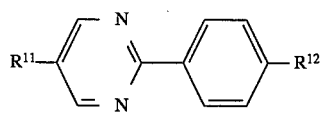

V

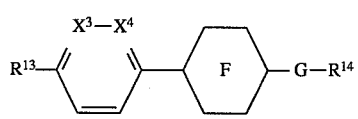

VI

-continued

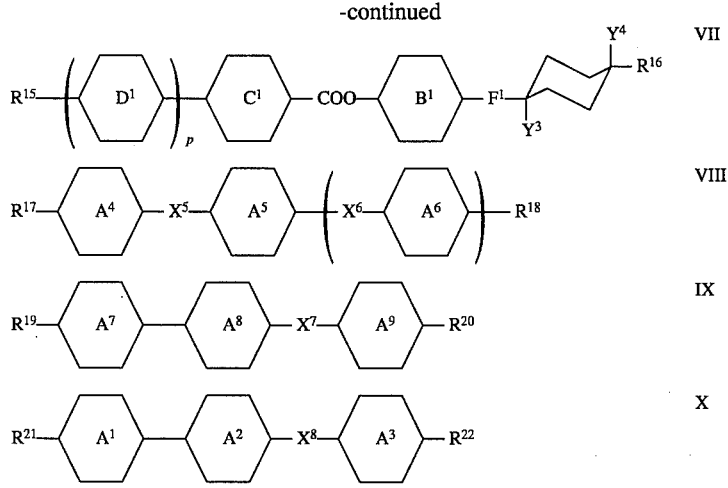

VII

VIII

IX

X wherein $R^9$ and $R^{10}$ are alkyl, alkoxy, alkanoyl, alkanoyloxy, alkoxycarbonyl or alkoxycarbonyloxy with up to 18 carbon atoms; r and s each independently are 1 or 2; $R^{11}$ and $R^{12}$ represent alkyl or alkoxy with 1–18 carbon atoms: $X^3$ stands for CH and $X^4$ stands for N or $X^3$ stands for N and $X^4$ stands for CH; G is a single covalent bond, trans-1,4-cyclohexylene, cis-4-cyano-trans-1,4-cyclohexylene or 1,4-phenylene, which is optionally substituted with halogen or methyl; ring F represents trans-1,4-cyclohexylene, 1,4-phenylene, which is optionally substituted with halogen or methyl, or, when G is a single covalent bond, also cis-4-cyano-trans-1,4-cyclohexylene; $R^{13}$ and $R^{14}$ each denote an optionally halogen-substituted alkyl or alkenyl group in which optionally one $CH_2$ group or two non-adjacent $CH_2$ groups is/are replaced by —O—, —COO— and/or —OOC—; p stands for the number 0 or 1: $E^1$ is a single covalent bond, —$CH_2$—$CH_2$—, —$OCH_2$—, —COO— or —OOC—; rings $B^1$, $C^1$ and $D^1$ denote 1,4-phenylene, which is optionally substituted with cyano, halogen or lower alkyl; $Y^3$ and $Y^4$ are hydrogen or one of the substituents $Y^3$ and $Y^4$ also is cyano; $R^{15}$ and $R^{16}$ each independently are halogen-substituted $C_1$-$C_{18}$-alkyl or optionally halogen-substituted $C_2$-$C_{18}$-alkenyl in which optionally one $CH_2$ group or two non-adjacent $CH_2$ groups is/are replaced by oxygen; $X^5$ represents a single covalent bond, —COO— or —OOC— and $X^6$ represents a single covalent bond, —COO—, —OOC—, —$CH_2$—$CH_2$—, —$OCH_2$— or —$CH_2O$—; rings $A^4$, $A^5$ and $A^6$ each independently are unsubstituted or cyano-, halogen- or lower alkyl-substituted 1,4-phenylene or one of the rings also is pyrimidine-2,5-diyl or pyrazine-2,5-diyl and/or, when p stands for the number 1, one of the rings also is trans-1,4-cyclohexylene or trans-m-dioxane- 2,5-diyl; $R^{17}$ is an optionally halogen-substituted alkenyl group with up to 18 carbon atoms in which optionally 1 $CH_2$ group or 2 non-adjacent $CH_2$ groups is/are replaced by —O—, —CO—, —COO— or —OOC— and/or optionally a C=C single bond is replaced by a C=C double bond; $R^{18}$ is an optionally halogen-substituted alkyl group with up to 18 carbon atoms in which optionally 1 $CH_2$ group or 2 non-adjacent $CH_2$ groups is/are replaced by —O—, —CO—, —COO— or —OOC— and/or optionally a C—C single bond is replaced by a C—C double bond: $X^7$ denotes a single covalent bond, —COO—, —OOC—, —$CH_2CH_2$—, —$OCH_2$— or —$CH_2O$—; one of rings $A^7$, $A^8$ and $A^9$ represents pyrimidine 2,5-diyl, one of rings $A^7$, $A^8$ and $A^9$ represents unsubstituted or cyano-, halogen- or lower alkyl substituted 1,4-phenylene and one of rings $A^7$, $A^8$ and $A^9$ represents trans-1,4-cyclohexylene or unsubstituted or cyano-, halogen- or lower alkyl-substituted 1,4-phenylene, and $R^{19}$ and $R^{20}$ each independently are an optionally halogen-substituted alkyl group with up to 18 carbon atoms in which optionally 1 $CH_2$ group or 2 non-adjacent $CH_2$ groups is/are replaced by —O—, —CO—, —COO— and/or —OOC—; $X^8$ denotes a single covalent bond —COO—, —OOC—, —$CH_2CH_2$—, —$OCH_2$— or —$CH_2$—; one of rings $A^1$, $A^2$ and $A^3$ represents trans-m-dioxane- 2,5-diyl and the other two of rings $A^1$, $A^2$ and $A^3$ each independently represent unsubstituted or cyano-, halogen- or lower-alkyl substituted 1,4-phenylene; $R^{21}$ and $R^{22}$ each independently are an optionally halogen-substituted alkyl group with up to 18 carbon atoms in which optionally 1 $CH_2$ group or 2 non-adjacent $CH_2$ groups is/are replaced by —O—, —CO—, —COO— and/or —OOC—.

The preparation of the liquid crystalline mixtures and of the electro-optical devices can be effected in a manner known per se.

The invention is illustrated in more detail by the following Examples. Optical antipodes have in each case the same phase transition temperatures and induce absolutely the same spontaneous polarization values and twisting values, but with opposite signs. The abbreviations used for the characterization of the phase transitions have the following significances:

C stands for crystalline

S stands for smectic $S_A$, $S_B$ etc. stand for smectic A, B etc.

$S^*_C$, $S^*_F$ stand for chiral smectic C, F etc.

Ch stands for cholesteric

N stands for nematic

I stands for isotropic.

The following Examples illustrate the present invention but are not intended to limit its extent in any manner. While the examples describe what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Unless otherwise stated, percentagse and ratios relating to solvent mixtures are expressed in volume, purity data determined by gas chromatography are expressed in area %, and the remaining percentages and ratios are expressed in weight. Temperatures are in degrees celsius (°C.), normal pressure is about 1 atmosphere, and room temperature is about 23° C. Examples were carried out as written unless otherwise indicated.

EXAMPLE 1

A solution of 2 g of 4,4"-p-terphenyldicarboxylic acid dichloride (preparable by reacting 4,4"-terphenyldicarboxylic acid with thionyl chloride in pyridine at 80° C.) in 200 ml of dry pyridine was treated with 2.16 g of L-(−)-menthol [1(R),2(S),5(R)-menthol] and stirred at 20° C. for 24 hours. Subsequently, the reaction mixture was poured into a mixture of ice and dilute hydrochloric acid. The crystalline product was removed by filtration, washed with water and dried in a high vacuum. Chromatographic purification and recrystallization gave pure 4,4"-di-[1(R),2(S),5(R)-menthyloxycarbonyl]-p-terphenyl with m.p. 168°–169° C.

The following compounds can be prepared in an analogous manner:

4,4"-Di-[1(S)-phenyl-1-ethoxycarbonyl]-p-terphenyl, m.p. 166.5°–167.5° C.;
4,4"-di-[1(S)-(p-methylphenyl)-1-ethoxycarbonyl]-p-terphenyl;
4,4"-di-[1(S)-(p-methoxyphenyl)-1-ethoxycarbonyl]-p-terphenyl;
4,4"-di-[2(S)-methyl-1-butyloxycarbonyl]-p-terphenyl, m.p. (C-$S_A$) 132° C., ($S_A$-Ch) 143° C. cl.p. (Ch-I) 145° C.;
4,4"-di-[2(S)-methyl-1-pentyloxycarbonyl]-p-terphenyl;
4,4"-di-[2(S)-methyl-1-hexyloxycarbonyl]-p-terphenyl;
4,4"-di-[2(S)-fluoro-1-propyloxycarbonyl]-p-terphenyl;
4,4"-di-[2(S)-chloro-1-propyloxycarbonyl]-p-terphenyl, m.p. (C-$S_A$) 123° C., ($S_A$-Ch) 135° C., cl.p. (Ch-I) 138° C.;
4,4"-di-[2(R)-cyano-1-propyloxycarbonyl]-p-terphenyl, m.p. 179.2° C.;
4,4"-di-[2(S)-fluoro-1-butyloxycarbonyl]-p-terphenyl;
4,4"-di-[2(S)-chloro-1-butyloxycarbonyl]-p-terphenyl;
4,4"-di-[2(R)-cyano-1-butyloxycarbonyl]-p-terphenyl;
4,4"-di-[2(S)-fluoro-3-methyl-1-butyloxycarbonyl]-p-terphenyl;
4,4"-di-[2(S)-chloro-3-methyl-1-butyloxycarbonyl]-p-terphenyl;
4,4"-di-[2(R)-cyano-3-methyl-1-butyloxycarbonyl]-p-terphenyl;
4,4"-di-[2(S)-fluoro-1-pentyloxycarbonyl]-p-terphenyl
4,4"-di-[2(S)-chloro-1-pentyloxycarbonyl]-p-terphenyl, m.p. (C-$S^*_C$) 106° C., ($S^*_C$-$S_A$) 110.2° C., ($S_A$-Ch) 140° C., cl.p. (Ch-I) 141° C.;
4,4"-di-[2(R)-cyano-1-pentyloxycarbonyl]-p-terphenyl, m.p. 129°–131° C.;
4,4"-di-[2(R)-fluoro-4-methyl-1-pentyloxycarbonyl]-p-terphenyl;
4,4"-di-[2(R)-chloro-4-methyl-1-pentyloxycarbonyl]-p-terphenyl, m.p. 169.4°–170.0° C.;
4,4"-di-[2(S)-cyano-4-methyl-1-pentyloxycarbonyl]-p-terphenyl, m.p. 129°–131° C.;
4,4"-di-[2(R)-fluoro-1-hexyloxycarbonyl]-p-terphenyl;
4,4"-di-[2(S)-chloro-1-hexyloxycarbonyl]-p-terphenyl;
4,4"-di-[2(R)-cyano-1-hexyloxycarbonyl]-p-terphenyl;
4-[2(S)-octyloxycarbonyl]-4"-[1(S)-phenyl-1-ethoxycarbonyl]-p-terphenyl;
4-[2(R)-octyloxycarbonyl]-4"-[1(S)-phenyl-1-ethoxycarbonyl]-p-terphenyl;
4-[2(S)-octyloxycarbonyl]-4"-[2(S)-chloro-1-pentyloxycarbonyl]-p-terphenyl;
4-[2(R)-octyloxycarbonyl]-4"-[2(S)-chloro-1-pentyloxycarbonyl]-p-terphenyl;
4-[2(S)-octyloxycarbonyl]-4"-[2(R)-cyano-1-pentyloxycarbonyl]-p-terphenyl;
4-[2(R)-octyloxycarbonyl]-4"-[2(R)-cyano-1-pentyloxycarbonyl]-p-terphenyl;
4-[2(S)-octyloxycarbonyl]-4"-[2(R)-chloro-4-methyl-1-pentyloxycarbonyl]-p-terphenyl;
4-[2(R)-octyloxycarbonyl]-4"-[2(R)-chloro-4-methyl-1-pentyloxycarbonyl]-p-terphenyl;
4-[2(S)-octyloxycarbonyl]-4"-[2(S)-cyano-4-methyl-1-pentyloxycarbonyl]-p-terphenyl;
4-[2(R)-octyloxycarbonyl]-4"-[2(S)-cyano-4-methyl-1-pentyloxycarbonyl]-p-terphenyl;
2,5-bis-[4-[2(S)-octyloxycarbonyl]phenyl]pyrimidine;
2,5-bis-[4-[1(R),2(S),5(R)-menthyloxycarbonyl]phenyl]pyrimidine;
2,5-bis-[4-[1(S)-phenyl-1-ethoxycarbonyl]phenyl]pyrimidine;
2,5-bis-[4-[2(S)-methyl-1-butyloxycarbonyl]phenyl]pyrimidine;
2,5-bis-[4-[2(S)-chloro-1-propyloxycarbonyl]phenyl]pyrimidine;
2,5-bis-[4-[2(R)-cyano-1-propyloxycarbonyl]phenyl]pyrimidine;
2,5-bis-[4-[2(S)-chloro-1-pentyloxycarbonyl]phenyl]pyrimidine;
2,5-bis-[4-[2(R)-cyano-1-pentyloxycarbonyl]phenyl]pyrimidine;
2,5-bis-[4-[2(R)-chloro-4-methyl-1-pentyloxycarbonyl]phenyl] pyrimidine;
2,5-bis-[4-[2(S)-cyano-4-methyl-1-pentyloxycarbonyl]phenyl] pyrimidine;
and the optical antipodes of the named compounds.

The alcohols used as the starting materials are known compounds or are analogues of known compounds or can be prepared according to the following methods:

1-Phenylethanol was reacted with phthalic anhydride to give the racemic monoester. The racemate resolution was effected by salt formation with (−)-1-phenylethylamine and fractional crystallization. Hydrolysis of the optically active monoesters with dilute potassium hydroxide solution gave S-(+)-1-phenylethanol and R-(−)-1-phenylethanol. Derivatives having a substituted phenyl residue can be obtained in an analogous manner.

L-Alanine was converted by diazotization with sodium nitrite in 6N hydrochloric acid and subsequent extraction with methylene chloride into S-2-chloropropionic acid. Reduction of the resulting acid with lithium aluminium hydride in dry diethyl ether gave S-(+)-2-chloro-1-propanol with $\alpha_D$=+19.3°. An analogous reaction of L-norvaline gave S-(−)-2-chloro-1-pentanol with $\alpha_D$=−32.5°. An analogous reaction of D-leucine gave R-(+)-2-chloro-4-methyl-1-pentanol with $\alpha_D$=+43.2°.

A solution of S-(+)-2-chloro-1-propanol in dimethylformamide was treated with potassium cyanide and heated to 70°–75° C. for 70 hours while stirring. There was thus obtained R-(−)-2-cyano-1-propanol with $\alpha_D$=−1.3°. An analogous reaction of S-(−)-2-chloro-1-pentanol gave R-(+)-2-cyano-1-pentanol with $\alpha_D$=+10.3°. An analogous reaction of R-(+)-2-chloro-4-methyl-1-pentanol gave S-(−)-2-cyano-4-methyl-1-pentanol with $\alpha_D$=−11.5°.

EXAMPLE 2 a) A suspension of 37.2 g of methoxymethyl-triphenylphosphonium chloride in 250 ml of t-butyl methyl ether is treated at room temperature while gassing with argon with 13.4 g of potassium t-butylate and stirred for 1 hour. Subsequently, the reaction mixture is treated at about 20° C. with a mixture of 9.49 g of 4-cyanobenzaldehyde and 100 ml of t-butyl methyl ether and stirred for a further 1 hour. Thereafter, the reaction mixture is partitioned in diethyl ether/water. The aqueous phase is extracted several times with diethyl ether. The organic phases are washed with water, dried over magnesium sulfate, filtered and evaporated. Chromatographic purification of the resulting crude product on silica gel with petroleum ether and toluene/hexane (vol. 3:1) gives 4-(2-methoxyvinyl)benzonitrile.

b) 15 ml of trimethyl orthoformate are treated at 0° C. while gassing with argon with 187 μl of boron trifluoride fluoride diethyl etherate and then within 10 minutes at about 90° C. with a solution of 2.7 g of 4-(2-methoxyvinyl)benzonitrile in 30 ml of trimethyl orthoformate. The reaction solution is stirred at room temperature for about 60 hours, then treated with 100 μl of triethylamine and evaporated. The crude product obtained is partitioned in diethyl ether and aqueous sodium hydrogen carbonate solution. The aqueous phase is extracted several times with diethyl ether. The organic phases are washed with aqueous sodium hydrogen carbonate solution and with water, dried over magnesium sulfate, filtered and evaporated. Chromatographic purification of the residue on silica gel with ethyl acetate/petroleum ether gives 2-(4-cyanophenyl)malondialdehyde tetramethyl acetal.

c) A solution of 3.9 g of 2-(4-cyanophenyl)malondialdehyde tetramethyl acetal in 50 ml of acetonitrile is treated while gassing with argon with 81.5 mg of p-toluenesulfonic acid monohydrate and 241 μl of water and heated to reflux for 2 hours. Subsequently, the reaction mixture is partitioned in diethyl ether and aqueous sodium hydrogen carbonate solution. The aqueous phase is extracted several times with diethyl ether. The organic phases are washed with aqueous sodium hydrogen carbonate solution, dried over magnesium sulfate, filtered and evaporated. Chromatographic purification of the resulting crude product on silica gel with ethyl acetate/petroleum ether gives 2-(4-cyanophenyl)-3-methoxyacrolein.

d) 247 mg of sodium are treated at room temperature with 10 ml of methanol. After 15 minutes the solution obtained is treated at room temperature with 1.58 g of 4-amidinobenzamide hydrochloride. A white suspension forms and this is treated dropwise at room temperature within 10 minutes with a solution of 1.42 g of 2-(4-cyanophenyl)-3-methoxyacrolein in 50 ml of methanol. The reaction mixture is stirred at room temperature for a further 2 hours and then suction filtered. The residue is washed with water, tetrahydrofuran and diethyl ether and dried in a high vacuum. 4-[5-(4-Cyanophenyl)-2-pyrimidinyl]benzamide is obtained.

e) 1.8 g of 4-[5-(4-cyanophenyl)-2-pyrimidinyl]benzamide are suspended in 30 ml of glacial acetic acid and 40 ml of 50 percent sulfuric acid and the mixture is heated (bath temperature 160° C.) for 3 hours. Thereafter, the cooled reaction mixture is poured into 200 ml of water and suction filtered. The residue is washed with water and dried in a high vacuum. There is thus obtained pyrimidin- 2,5-ylene bis(4-benzoic acid).

f) A mixture of 80 mg of pyrimidin-2,5-ylene bis(4-benzoic acid) and 10 ml of pyridine is treated with 80 μl of thionyl chloride and heated to 80° C. for 20 hours. Subsequently, the cooled reaction mixture is treated with 0.5 ml of R-(−)-2-octanol and heated slowly to 100° C. while stirring within 20 hours. Thereafter, the reaction mixture is cooled and partitioned in diethyl ether and water. The aqueous phase is separated and back-extracted with diethyl ether. The organic phases are washed with 2N hydrochloric acid and with water, dried over magnesium sulfate, filtered and evaporated. Chromatographic purification of the residue on silica gel with ethyl acetate/petroleum ether gives 2,5-bis-[4-(2(R)-octyloxycarbonyl)phenyl] pyrimidine.

The following compounds can be prepared in an analogous manner:

2,5-Bis-[4-(1(R),2(S),5(R)-menthyloxycarbonyl)phenyl] pyrimidine;
2,5-bis-[4-(1(S)-phenyl-1-ethoxycarbonyl)phenyl]pyrimidine;
2,5-bis-[4-(2(S)-methyl-1-butyloxycarbonyl)phenyl]pyrimidine;
2,5-bis-[4-(2(S)-chloro-1-propyloxycarbonyl)phenyl]pyrimidine;
2,5-bis-[4-(2(R)-cyano-1-propyloxycarbonyl)phenyl]pyrimidine;
2,5-bis-[4-(2(S)-chloro-1-pentyloxycarbonyl)phenyl]pyrimidine;
2,5-bis-[4-(2(R)-cyano-1-pentyloxycarbonyl)phenyl]pyrimidine;
2,5-bis-[4-(2(R)-chloro-4-methyl-1-pentyloxycarbonyl)phenyl] pyrimidine;
2,5-bis-[4-(2(S)-cyano-4-methyl-1-pentyloxycarbonyl)phenyl] pyrimidine;
and the optical antipodes of the named compounds.

EXAMPLE 3

The spontaneous polarization induced by compounds of formula I in tilted smectic phases was investigated on the basis of mixtures with 4-octyloxybenzoic acid 4-hexyloxyphenyl ester. 4-Octyloxybenzoic acid 4-hexyloxyphenyl ester (95 wt. %) was in each case doped with 5 wt. % of a compound of formula I. The spontaneous polarization $P_S$ of the mixture was measured at 40°±1° C. and the extrapolated value $P_S^e$ of the spontaneous polarization for the particular compound was calculated therefrom. The values of $P_S$ and $P_S^e$ given hereinafter are in each case absolute values.

4,4"-Di-[1(R),2(S),5(R)-menthyloxycarbonyl]-p-terphenyl, $P_S=11$ nC/cm², $P_S^e=220$ nC/cm²;
4,4"-di-[1(S)-phenyl-1-ethoxycarbonyl]-p-terphenyl, $P_S=14$ nC/cm², $P_S^e=280$ nC/cm²;
4,4"-di-[2(S)-methyl-1-butyloxycarbonyl]-p-terphenyl, $P_S=0.85$ nC/cm², $P_S^e=17$ nC/cm²;
4,4"-di-[2(S)-chloro-1-propyloxycarbonyl]-p-terphenyl, $P_S=0.51$ nC/cm², $P_S^e=10.2$ nC/cm²;
4,4"-di-[2(R)-cyano-1-propyloxycarbonyl]-p-terphenyl, $P_S 5.53$ nC/cm², $P_S^e=111$ nC/cm²;
4,4"-di-[2(S)-chloro-1-pentyloxycarbonyl]-p-terphenyl, $P_S=6.8$ nC/cm², $P_S^e=136$ nC/cm²;
4.4"-di-[2(R)-cyano-1-pentyloxycarbonyl]-p-terphenyl, $P_S=20$ nC/cm², $P_S^e=2$;
4,4"-di-[2(R)-chloro-4-methyl-1-pentyloxycarbonyl]-p-terphenyl, $P_S=9$ nC/cm², $P_S^e 180$ nC/cm²;
4,4"-di-[2(S)-cyano-4-methyl-1-pentyloxycarbonyl]-p-terphenyl, $P_S=20$ nC/cm², $P_S^e=400$ nC/cm².

We claim:
1. An optically active compound of the formula

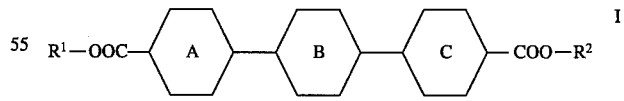

wherein rings A, B and C each independently are 1,4-phenylene, which is unsubstituted or substituted with halogen, or is pyrimidin-2,5-diyl or pyridin-2,5-diyl, with the proviso that no more than one of the rings A, B or C is pyrimidin-2,5-diyl or pyridin-2,5-diyl; $R^1$ is a group $-(CH_2)_m-C^*HX^1-R^3$; $R^2$ is a group $-(CH_2)_n-C^*HX^2-R^4$; m and n each independently stand for the number 0 or 1; $C^*$ denotes a chiral carbon atom; $X^1$ and $X^2$ each independently are methyl or methoxy; $R^3$ and $R^4$ each independently are a group R, provided that $R^3$ is different from $X^1$ and $R^4$ is different from $X^2$; R is an $C_{1-15}$ alkyl or an $C_{2-15}$ alkenyl group, provided that $R^1$ and $R^2$ are not simultaneously 2-alkyl when rings A, B and C together are unsubstituted p-terphenyl.

2. An optically active compound according to claim 1, wherein rings A, B and C each independently are 1,4-phenylene, which is unsubstituted or substituted with at least one halogen.

3. An optically active compound according to claim 1, wherein one of rings A, B and C is pyrimidine-2,5-diyl.

4. An optically active compound according to claim 1, having the formula:

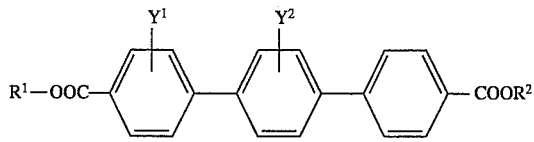

wherein $R^1$ and $R^2$ are as described in claim 1; and each of $Y^1$ and $Y^2$ independently are hydrogen or halogen, provided that at least one of $Y^1$ and $Y^2$ is different from hydrogen when $R^1$ and $R^2$ both are 2-alkyl.

5. An optically active compound according to claim 1, wherein $R^1$ represents a group —$(CH_2)_m$—$C^*HX^1$—$R^3$ in which m stands for the number 0 and $X^1$ stands for methyl.

6. An optically active compound according to claim 1, wherein $R^1$ represents a group —$(CH_2)_m$—$C^*HX^1$—$R^3$ in which m stands for the number 1 and $X^1$ stands for methyl or methoxy.

7. An optically active compound according to claim 1, wherein $R^2$ represents a group —$(CH_2)_n$—$C^*HX^2$—$R^4$ in which n stands for the number 0 and $X^2$ stands for methyl.

8. An optically active compound according to claim 1, wherein $R^2$ represents a group —$(CH_2)_n$—$C^*HX^2$—$R^4$ in which n stands for the number 1 and $X^2$ stands for methyl or methoxy.

9. An optically active compound according to claim 1, wherein $R^3$ and $R^4$ each are alkyl or alkenyl with a maximum of 15 carbon atoms.

10. An optically active compound according to claim 1, wherein $R^1$ and $R^2$ have the same significance.

11. A liquid crystalline mixture having at least two components wherein at least one component is an optically active compound of formula

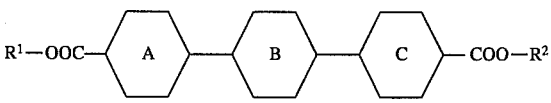

wherein rings A, B and C each independently are 1,4-phenylene, which is unsubstituted or substituted with halogen, or is pyrimidin-2,5-diyl or pyridin-2,5-diyl, with the proviso that no more than one of the rings A, B or C is pyrimidin-2,5-diyl or pyridin-2,5-diyl; $R^1$ is a group —$(CH_2)_m$—$C^*HX^1$—$R^3$; $R^2$ is a group —$(CH_2)_n$—$C^*HX^2$—$R^4$; m and n each independently stand for the number 0 or 1; C* is a chiral carbon atom; $X^1$ and $X^2$ each independently are methyl or methoxy; $R^3$ and $R^4$ each independently are a group R, provided that $R^3$ is different from $X^1$ and $R^4$ is different from $X^2$; R is an $C_{1-15}$ alkyl or an $C_{2-15}$ alkenyl group; provided that $R^1$ and $R^2$ are not simultaneously 2-alkyl when rings A, B and C together are unsubstituted p-terphenyl.

12. An electro-optical cell comprising:

a) two plate means;

b) a liquid crystal means disposed between two plate means and including an optically active compound of formula

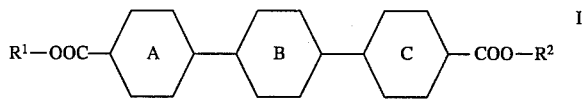

wherein rings A, B and C each independently are 1,4-phenylene, which is unsubstituted or substituted with halogen, or is pyrimidin-2,5-diyl or pyridin-2,5-diyl, with the proviso that no more than one of the rings A, B or C is pyrimidin-2,5-diyl or pyridin-2,5-diyl; $R^1$ is a group —$(CH_2)_m$—$C^*HX^1$—$R^3$; $R^2$ is a group —$(CH_2)_n$—$C^*HX^2$—$R^4$; m and n each independently stand for the number 0 or 1; C* is a chiral carbon atom; $X^1$ and $X^2$ each independently represent methyl or methoxy; $R^3$ and $R^4$ each independently are a group R, provided that $R^3$ is different from $X^1$ and $R^4$ is different from $X^2$; R is an $C_{1-15}$ alkyl or an $C_{2-15}$ alkenyl group; provided that $R^1$ and $R^2$ are not simultaneously 2-alkyl when rings A, B and C together are unsubstituted p-terphenyl; and c) means for applying an electrical potential to said plate means.

* * * * *